(12) United States Patent
Kremmer et al.

(10) Patent No.: US 11,324,158 B2
(45) Date of Patent: May 10, 2022

(54) SYSTEM AND METHOD FOR CONTROLLING AN IMPLEMENT CONNECTED TO A VEHICLE

(71) Applicant: Deere & Company, Moline, IL (US)

(72) Inventors: Martin Kremmer, Laumersheim (DE); Tobias Schaefer, Obermoschel (DE); Joshua T. Lawson, Woodbury, MN (US); Matthias Meyer, Kaiserslautern (DE)

(73) Assignee: Deere & Company, Moline, IL (US)

( * ) Notice: Subject to any disclaimer, the term of this patent is extended or adjusted under 35 U.S.C. 154(b) by 270 days.

(21) Appl. No.: 16/664,324

(22) Filed: Oct. 25, 2019

(65) Prior Publication Data

US 2020/0236837 A1 Jul. 30, 2020

Related U.S. Application Data

(60) Provisional application No. 62/796,700, filed on Jan. 25, 2019.

(51) Int. Cl.
*A01B 79/00* (2006.01)
*A01B 69/00* (2006.01)
*A01B 69/04* (2006.01)
*G07C 5/08* (2006.01)

(52) U.S. Cl.
CPC .......... *A01B 79/005* (2013.01); *A01B 69/001* (2013.01); *A01B 69/008* (2013.01); *G07C 5/08* (2013.01)

(58) Field of Classification Search
CPC ... A01B 69/001; A01B 69/006; A01B 69/008; A01B 79/00; A01B 79/005; G07C 5/08

USPC ........................................................ 701/50
See application file for complete search history.

(56) References Cited

U.S. PATENT DOCUMENTS

| | | | |
|---|---|---|---|
| 5,857,539 A | 1/1999 | Diekhans et al. | |
| 8,577,558 B2 * | 11/2013 | Mitchell | A01B 69/004 701/50 |
| 2002/0193928 A1 | 12/2002 | Beck | |
| 2006/0282205 A1 * | 12/2006 | Lange | G01C 21/20 701/50 |

(Continued)

FOREIGN PATENT DOCUMENTS

| | | | |
|---|---|---|---|
| CA | 3010410 A1 * | 2/2019 | ........... A01B 69/004 |
| CA | 3048851 A1 * | 2/2020 | ........... A01B 63/002 |

(Continued)

OTHER PUBLICATIONS

European Search Report issued in counterpart application No. 19212738.9 dated Jun. 5, 2020 (10 pages).

*Primary Examiner* — Atul Trivedi

(57) ABSTRACT

A system and method for controlling an implement connected to a vehicle is described, wherein the implement is adapted to perform an agricultural operation on a field, the vehicle has steerable ground engaging means for propelling the vehicle over the field, an actuator is arranged to control at least one of a yaw angle and a lateral position of the implement with respect to the vehicle, and an implement control unit is programmed to control the actuator based upon a first signal regarding a difference between a sensed lateral position of the implement and a nominal lateral position of the implement and a second signal regarding a steering movement of the vehicle.

10 Claims, 3 Drawing Sheets

(56) References Cited

U.S. PATENT DOCUMENTS

| | | | | |
|---|---|---|---|---|
| 2009/0032273 A1* | 2/2009 | Hahn | ............... | A01B 69/004 172/2 |
| 2009/0272551 A1* | 11/2009 | Thompson | ............ | A01B 69/003 172/284 |
| 2010/0017075 A1* | 1/2010 | Beaujot | ............... | A01B 69/008 701/50 |
| 2013/0110358 A1 | 5/2013 | Merx et al. | | |
| 2013/0186657 A1 | 7/2013 | Kormann et al. | | |
| 2014/0324291 A1* | 10/2014 | Jones | ................ | G05D 1/0278 701/41 |
| 2016/0057921 A1* | 3/2016 | Pickett | ............... | G05D 1/021 701/41 |
| 2017/0311534 A1* | 11/2017 | Rusciolelli | ........... | A01B 79/005 |
| 2017/0316692 A1* | 11/2017 | Rusciolelli | ........... | A01B 79/005 |
| 2017/0325443 A1* | 11/2017 | Crinklaw | ............ | A01M 7/0089 |
| 2018/0035606 A1* | 2/2018 | Burdoucci | ............ | A01D 34/84 |
| 2018/0092295 A1* | 4/2018 | Sugumaran | ........... | A01C 23/007 |
| 2018/0168094 A1* | 6/2018 | Koch | ............... | A01C 7/203 |
| 2018/0215393 A1* | 8/2018 | Miyakubo | ................ | B60Q 9/00 |
| 2018/0242517 A1* | 8/2018 | Davis | ............... | A01C 7/208 |
| 2018/0243771 A1* | 8/2018 | Davis | ............... | B05B 12/12 |
| 2018/0243772 A1* | 8/2018 | Davis | ............... | A01M 7/0053 |
| 2018/0243773 A1* | 8/2018 | Davis | ............... | A01M 7/0057 |
| 2018/0243774 A1* | 8/2018 | Davis | ............... | A01B 69/001 |
| 2018/0317388 A1* | 11/2018 | Gresch | ............... | A01B 79/005 |
| 2018/0319396 A1* | 11/2018 | Foster | ............... | B60W 30/0956 |
| 2018/0321682 A1* | 11/2018 | Matsumoto | ............ | G01S 19/14 |
| 2018/0373259 A1* | 12/2018 | Aberle | ................ | A01B 69/008 |
| 2019/0307070 A1* | 10/2019 | Dima | ................ | A01D 57/04 |
| 2019/0343032 A1* | 11/2019 | Stanhope | ............... | A01B 76/00 |
| 2020/0093053 A1* | 3/2020 | Ehlert | ................ | A01B 69/008 |
| 2020/0236833 A1* | 7/2020 | Kremmer | ............... | A01B 63/10 |
| 2020/0288621 A1* | 9/2020 | Kremmer | ............ | G05D 1/0212 |
| 2021/0000006 A1* | 1/2021 | Ellaboudy | ............ | G06K 9/4661 |
| 2021/0084820 A1* | 3/2021 | Vandike | ............. | A01D 41/1278 |
| 2021/0105995 A1* | 4/2021 | Palomares | ........... | G05D 1/0246 |
| 2021/0176916 A1* | 6/2021 | Sidon | ................... | A01B 79/005 |
| 2021/0192754 A1* | 6/2021 | Sibley | .................... | A01M 1/20 |
| 2021/0212249 A1* | 7/2021 | Disberger | ............ | A01B 63/023 |

FOREIGN PATENT DOCUMENTS

| | | | | |
|---|---|---|---|---|
| DE | 102015009889 A1 | | 2/2017 | |
| DE | 102016212201 A1 | | 1/2018 | |
| DE | 102017113726 A1 | | 12/2018 | |
| EP | 1210854 A1 | | 6/2002 | |
| EP | 1475609 A2 | | 11/2004 | |
| EP | 2283719 A2 | | 2/2011 | |
| EP | 2910098 A1 | | 8/2015 | |
| EP | 3170380 A1 | | 5/2017 | |
| EP | 3364265 A1 | | 8/2018 | |
| EP | 3366130 A1 | * 8/2018 | ............... B05B 9/06 |
| EP | 3366131 A1 | * 8/2018 | ............... A01C 23/007 |
| EP | 3366132 A1 | * 8/2018 | ............... B05B 9/06 |
| EP | 3366133 A1 | * 8/2018 | ............... A01C 7/08 |
| EP | 3366134 A1 | * 8/2018 | ........... A01B 63/004 |
| EP | 3685649 A1 | * 7/2020 | ........... A01B 69/001 |
| WO | 2008005195 A2 | | 1/2008 | |
| WO | WO2015065174 A1 | | 5/2015 | |
| WO | WO-2017201466 A1 | * 11/2017 | ........... A01D 89/004 |

* cited by examiner

SYSTEM AND METHOD FOR CONTROLLING AN IMPLEMENT CONNECTED TO A VEHICLE

TECHNICAL FIELD

This invention relates generally to agricultural vehicles. More particularly it relates to a vehicle with an implement for agricultural purposes and a method for controlling the implement during work on a field.

BACKGROUND

A number of agricultural operations require that an implement is guided along a nominal path, such that the operation performed by the implement is performed at a desired location. Such a location can be a place where a seed particle is to be sown (with a seeding or drill machine) or where a plant growing in the field is to be fertilized (with a spreader or sprayer) or where weed is to be hoed (with a cultivator) or sprayed (with a sprayer). Normally, such implements are moved by a vehicle over the field. The vehicle and/or the implement can be provided with a location determining apparatus, like a global navigation satellite system (GNSS) receiver, or a camera with an image processing system recognizing features in the field, in particular plant rows. The implement can be supported on the vehicle or towed behind the vehicle.

In a number of prior art implementations, only the vehicle is actively steered, with the implement towed behind the vehicle by a tongue. Since the vehicle and the implement move, at least when deviating from straight steering, on different respective paths, a certain error in the implement path results, which was proposed to reduce by steering the vehicle in a manner such that the implement follows a desired path (WO 2008/005195 A2). It was also proposed to steer the vehicle on a desired path (based on a camera or GNSS receiver) and to control an actuator adapted for a lateral adjustment of the implement with respect to the vehicle (also based on a camera or GNSS receiver) to keep the implement on the desired path (EP 2283719 A2, US 2013/0110358 A1), thus compensating for possible steering errors of the vehicle.

One disadvantage of the prior art systems controlling an actuator influencing the lateral position (or yaw angle) of the implement with respect to the vehicle in a manner to keep the implement on a desired path is that any automatic or manual steering action of the vehicle influences the lateral position of the implement. Once the vehicle thus performs a steering action, the implement also moves laterally and the control system of the implement will hence—with a certain time delay—sense an error between the actual lateral position of the implement and the nominal path and react with a control signal to the actuator, which moves the implement back to the desired path. This control reaction takes time and it is possible that the implement deviates far enough from the intended path that it cannot perform the desired agricultural operation over a significant length and/or that plants are damaged or destroyed by the implement. The present disclosure attempts to mitigate these disadvantages.

SUMMARY

Various aspects of examples of the present disclosure are set out in the claims.

According to a first aspect of the present disclosure, a system for controlling an implement connected to a vehicle can include steerable ground engaging means, an actuator, and an implement control unit. The implement can be adapted to perform an agricultural operation on a field. The vehicle can include steerable ground engaging means for propelling the vehicle over the field. The actuator can be arranged to control at least one of a yaw angle and a lateral position of the implement with respect to the vehicle. The implement control unit can be programmed to control the actuator based upon a first signal regarding the difference between a sensed lateral position of the implement and a nominal lateral position of the implement, and a second signal regarding a steering movement of the vehicle. The implement control unit can be programmed to control the actuator to minimize the difference between the sensed lateral position and the nominal lateral position and thereby to predictively consider an expected lateral movement of the implement due to a change of the trajectory of the vehicle caused by the steering movement of the vehicle.

The second signal can comprise data regarding at least one of a steering angle of the vehicle, a steering angle change rate of the vehicle, a propelling speed of the vehicle, a geometric parameter of the vehicle, a propelling direction of the vehicle, and a radius of a curve driven by the vehicle.

The implement control unit can be adapted to learn a relation between the second signal and a control signal to the actuator from the first signal and the second signal.

The first signal can be provided by at least one of a positioning system and a camera with an image processing system.

The second signal can be provided by a sensor interacting with a manually actuated steering system of the vehicle or by at least one of an automatic steering system of the vehicle, a positioning system associated with the vehicle and an inertial sensor associated with the vehicle.

According to a second aspect of the present disclosure, a method of controlling an implement connected to a vehicle is provided, wherein the implement performs an agricultural operation on a field, the vehicle has steerable ground engaging means propelling the vehicle over the field, an actuator controls at least one of a yaw angle and a lateral position of the implement with respect to the vehicle, and an implement control unit controls the actuator based upon a first signal regarding the difference between a sensed lateral position of the implement and a nominal lateral position of the implement, and a second signal regarding a steering movement of the vehicle.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

At least one example embodiment of the subject matter of this disclosure is understood by referring to FIGS. 1 through 5 of the drawings.

Figure 1:
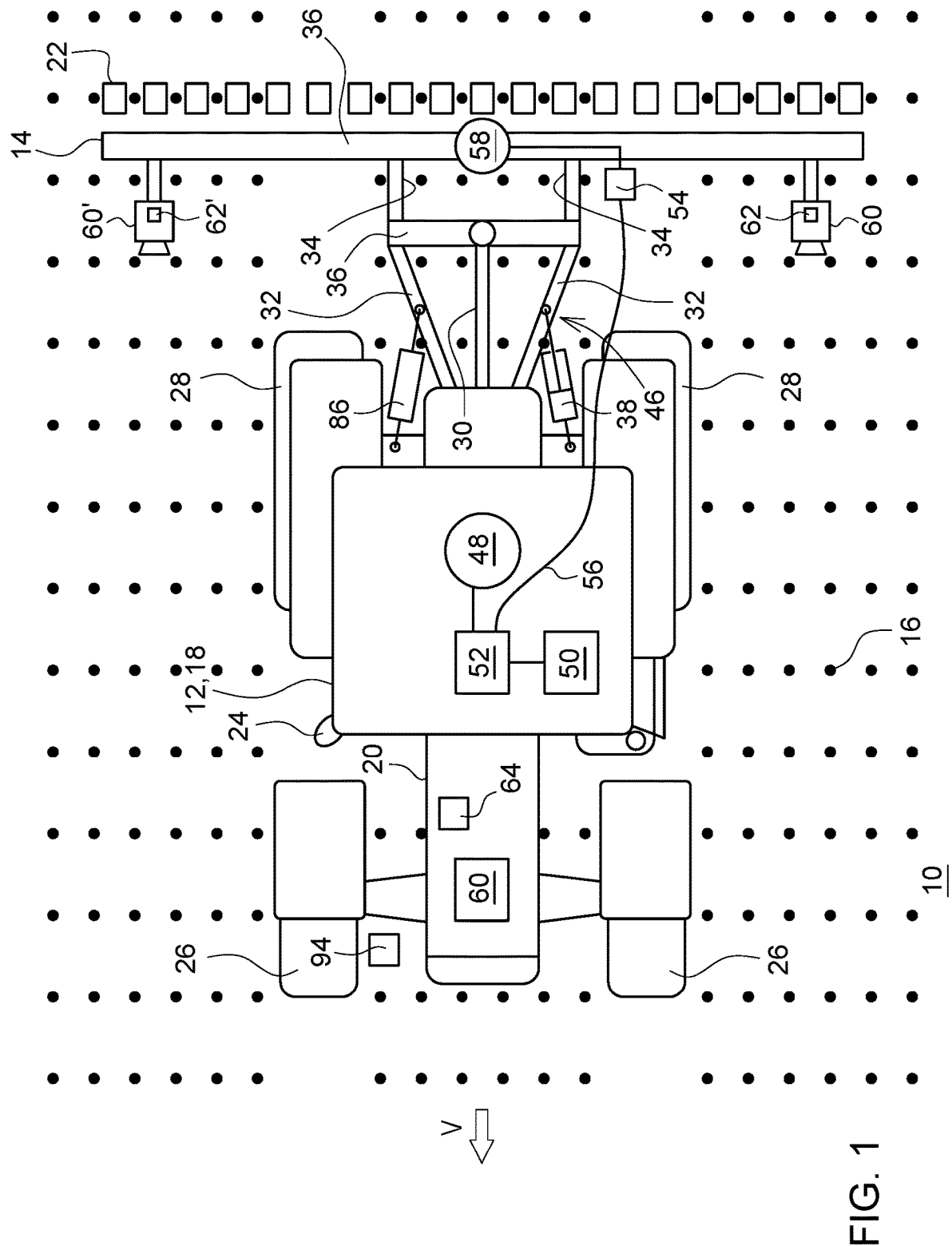
FIG. 1 is a schematic top view of an agricultural vehicle with an implement and a system for controlling the lateral position of the implement during a cultivation operation on a field.

FIG. 1 shows a top view of a field 10 on which an agricultural vehicle 12, comprising a self-propelled vehicle and an implement 14 connected thereto, is operating. On the field 10, plants 16 have been planted or sown during a previous work step. The plants 16 are planted in a rectangular pattern, as shown, or any other possible pattern, for example in a hexagonal or diamond-shaped pattern, or just cover the entire field without any regular pattern, as when sown with a drill machine. The plants 16 can be sown or planted in any useful manner, like based on a positioning system (for example, GPS) receiver or using local sensors on the seeding or planting vehicle.

The vehicle 12 is a tractor 18 with a chassis 20 or frame supported on ground engaging means in the form of steerable front wheels 26 and driven rear wheels 28. The vehicle 12 also comprises an operator cab 24 and an engine 61 for driving the rear wheels 28 and optionally the front wheels 26 and a PTO (not shown).

Implement 14 comprises a cross beam 36 supporting a number of row units 22 distributed side by side along the length of the cross beam 36. The row units 22 are performing an agricultural operation on the field 10. In the embodiment shown, the row units 22 can be hoes for weeding or spraying device for feeding the plants 16. In the embodiment shown, between each row of plants 16, seen in the forward direction V of the vehicle 12 (which extends in FIG. 1 to the left), one row unit 22 is provided, also it would be possible to have a row unit 22 only between two adjacent rows and the space between the next two rows is without a row unit 22, or two row units 22 are assigned to a single row of plants 16 and thus interact from both sides of the plants. In other embodiments, the row units 22 can be seeding units for depositing seed or plants in the ground in a desired pattern.

On the rear of the chassis 20, a three-point hitch 46 with lower links 32 and an upper link 30 is mounted. The links 30, 32 are connected at their rear ends to a transverse support bar 36, which on its end is connected by longitudinal bars 34 to the cross beam 36 of the implement 14. The links 30 and 32 are pivotally mounted around vertical axes to the chassis 20 and to the transverse support bar 36. An actuator 38 in the form of a hydraulic cylinder is connected with its first end to the chassis 20 and with its second end to the lower links 32, respectively, and can thus move the transverse support bar 36 and hence the entire implement 14 in a parallelogram-wise manner in a lateral direction (extending horizontally and transversely to the forward direction V). The actuator 38 is controlled by a valve block 50 which is connected to an electronic vehicle control unit 52. The electronic vehicle control unit 52 is adapted to receive a control signal via a bus system 56 (preferably operating according to standard ISO 11783) which transmits control commands from an electronic implement control unit 54 to the vehicle control unit 52. The implement control unit 54 thus can control the lateral position of the implement 14. This is described in more detail in DE 102016212201 A1, the contents of which are incorporated herein by reference. A sensor 86 detects the angle of one of the lower links 32 with respect to the chassis 20 around the vertical axis and thus provides a signal regarding the lateral position of the implement 14 with respect to chassis 20. It should be mentioned that sensor 86 could be integrated into the housing of actuator 38 (cf. EP 1210854 A1). In another embodiment, actuators 38 could be used between the chassis 20 and each lower link 32, with integrated or separate sensors 86, wherein the actuators are double or single acting.

In another possible embodiment, the implement 14 can be connected to the vehicle 12 by a so-called side shift frame, using an actuator for lateral position control of the implement 14, as described for example in EP 2283719 A2 and US 2013/0110358 A1, the contents of which are incorporated herein by reference. It would also be possible to support the implement 14 on wheels and connect it to a hitch of the vehicle 12 by a tongue and to have at least one actuator 38 actively control the angle of the tongue and/or to control the steering angle of the wheels of the implement by the actuator (cf. US 2013/0186657 A1, the contents of which are incorporated herein by reference).

Thus, the lateral position of the implement 14 is controlled by the implement control unit 54 using the actuator 38. Since the implement 14 is intended to move over the field 10 at a lateral position where the row units 22 are located at their appropriate positions between the rows of plants 16 in order to provide the desired agricultural operation and avoid damage to the plants (or in any useful nominal position useful to perform an agricultural operation, like seeding, planting, nursing or harvesting the plants), the implement control unit 54 is automatically guided along the rows of plants 16, based on signals of a first camera 60 with an image processing system 62, an optional second camera 60' with an image processing system 62' and an optional receiver 58 for receiving signals of a satellite-based positioning system, like GPS, Glonass, or Galileo. The receiver 58 is mounted on the cross beam 36 of the implement 14. The image processing systems 62 could also be integrated into the implement control unit 54. In another embodiment, the implement control unit 54 could also be incorporated in the vehicle control unit 52.

The cameras 60, 60' are mounted on the cross beam 36 of the implement 14 and look onto the field 10 in front of the implement. The image processing systems 62, 62' extract from the images the relative position of the rows of plants 16 with respect to the camera 60, 60' and compare this position with a pre-stored or programmed nominal (desired) position of the plants. Thus, a first signal is provided to the implement control unit 54 indicating a possible deviation between the actual lateral position and the nominal lateral position of the implement 14. The signals from the image processing systems 62, 62' can be augmented or replaced by signals from the receiver 58, using a pre-stored map with the location of the plants 16 as reference. Fusing the signals from image processing systems 62, 62' and receiver 58 can be based on the relative quality of the signals.

Thus, as mentioned, the implement control unit 54 controls the actuator 38 to have the implement 14 and its row units 22, based on the first signal, moving along a nominal path. In the shown embodiment, this nominal path is defined by the position of the plants 16 on the field and actuator 38 is controlled by the implement control unit 54 (using appropriate software) based on the signals from cameras 60 and optionally 60' such that the row units 22 move between the plants 16 (according to the position of the plants as detected by the camera 60, 60'). The nominal path can alternatively or additionally be pre-stored in a memory of the implement control unit 54 and the actuator 38 be controlled based on the stored nominal path. Both options and their combination are generally described in US 2002/0193928 A1, the contents of which are incorporated by reference herein. An embodiment of lateral guidance of the implement 14 based on cameras 60, 60', and receiver 58 is also described in more detail in EP 2910098 A1, the contents of which are incorporated herein by reference.

The front wheels 26 of the vehicle 12 can be steered manually by an operator of vehicle 12 in a conventional manner or the vehicle control unit 52 controls a steering actuator 64 influencing the steering angle of the front wheels 26 based upon signals from a positioning system with a receiver 48 for receiving signals of a satellite-based positioning system, like GPS, Glonass, or Galileo, using a pre-stored map with the location of the plants 16 or a path (tramline) to drive over the field 10 as reference. The receiver 48, optionally incorporating an inertial measuring unit (IMU), as described in EP 1475609 A2, is mounted on the roof of cab 24. Alternatively or additionally, the vehicle 12 can be steered based upon a camera (not shown) mounted on the vehicle 12 with an image processing system detecting the rows of plants 16 in front of the vehicle. It should also be mentioned that in case of a track-based vehicle 12, the steering angle thereof could be influenced by speed differences of the tracks on both sides of the vehicle 12, and in case of articulated steering, an actuator would control the steering angle of vehicle 12 by rotating the front and rear parts of the vehicle 12 around a joint.

Figure 2:
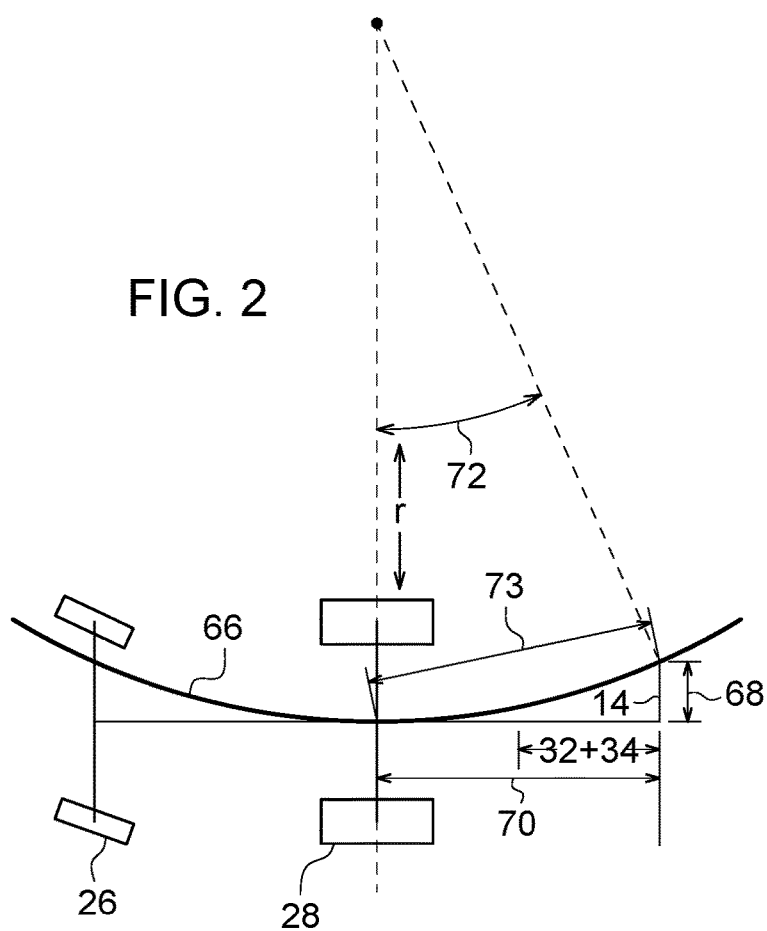
FIG. 2 is a schematic top view of the agricultural vehicle of FIG. 1 when driving on a curve to display the impact of the vehicle orientation due to steering onto the implement.

There may be cases in which the vehicle 12 is not steered on a straight path as shown in FIG. 1, but drives on a curve. This may be the case if the field 10 has curved contours (and thus the nominal path of the vehicle 12, steered manually or automatically, comprises curves) or if the vehicle 12 should deviate from a desired path due to external influences, like lateral slope or wind or operator distraction in case of manual steering. As shown in FIG. 2 in a simplified diagram, a steering movement of the front wheels 26 to drive vehicle 12 on a curve moves the center of the rear axle (located between the rear wheels 28) on a curve with a radius r. The lateral error 68 of the implement 14 due to the steering movement depends on the radius r (which depends on the steering angle of the front wheels 26 and the wheelbase (distance between front wheels 26 and rear wheels 28 in the forward direction)) and on the distance 70 between the implement 14 and the center of the rear axle (thus on the length of the part of the chassis 20 between the center of the rear axle and the three-point hitch 46, the length of the three-point hitch 46 and the length of the longitudinal bars 34, all measured in the forward direction V), as can be seen in FIG. 2 and be calculated by known equations.

In particular, the central angle 72 in FIG. 2 corresponds to 90° minus the arc cosine of distance 70 divided by radius r. The cord length 73 corresponds to twice r multiplied by the sine of half of the central angle 72. Finally, the lateral error 68 is the square root of the difference between the squared cored length 72 and the squared distance 70.

This lateral error 68 is evaluated by the vehicle control unit 52 and sent via bus 56 to the implement control unit 54, or evaluated by the implement control unit 54, which considers this as a second signal, further to the first signal mentioned above, when calculating the control signal to the actuator 38. In this way, the lateral error 68 is influencing the deviation of the implement 14 from its desired position at least to a lesser extent then without considering the second signal.

Figure 3:
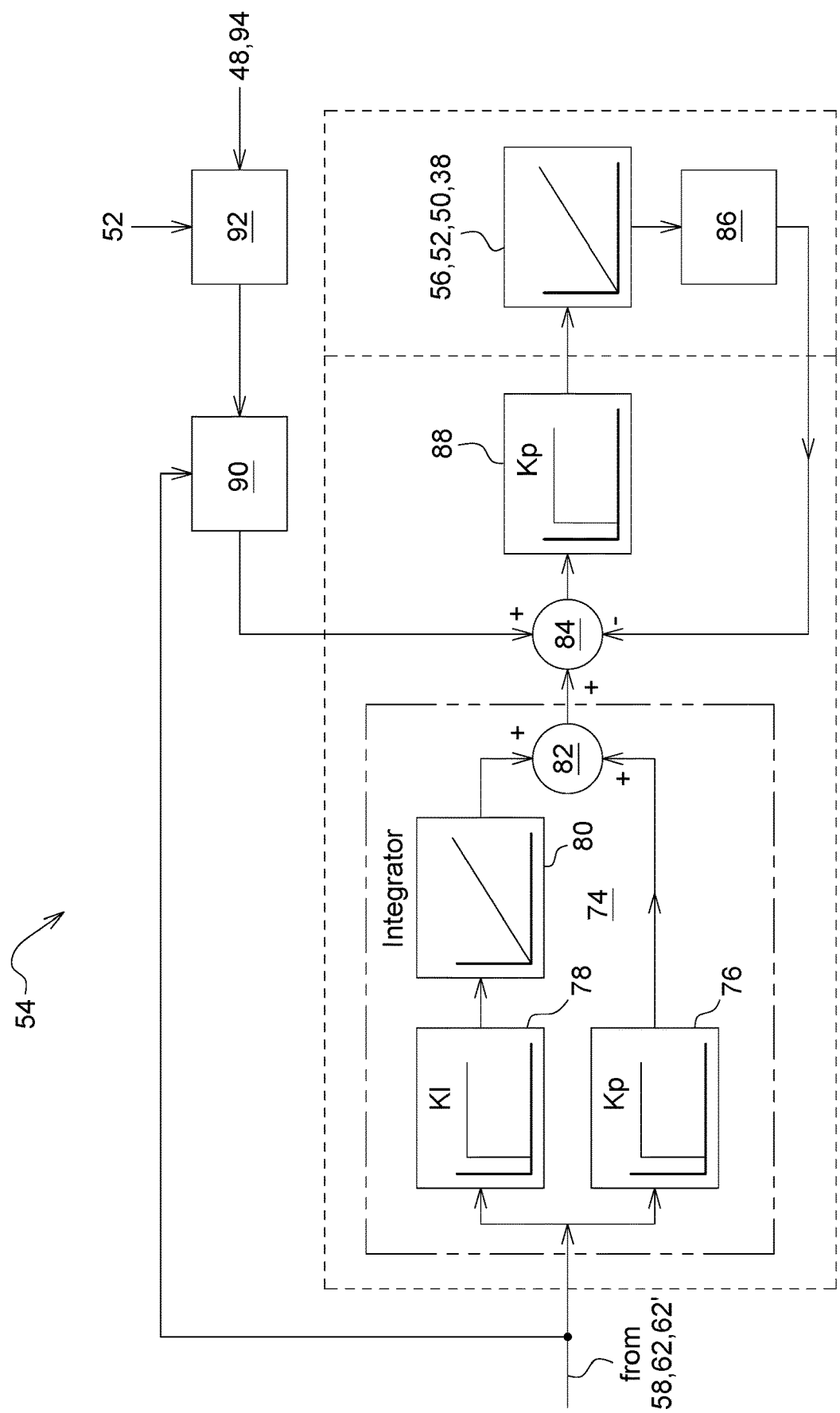
FIG. 3 is a schematic representation of a first embodiment of the system for controlling the lateral position of the implement.

FIG. 3 schematically displays an arrangement and operation of the implement control unit 54. The first signal indicating the offset between sensed and desired lateral position of the implement 14, provided by the image processing systems 62, 62' and/or receiver 58, is sent to a proportional-integral controller 74 with a proportional branch 76 and an integral branch 78 comprising an integrator 80 and an adder 82 for the outputs of the proportional branch 76 and the integrator 80. In another embodiment, controller 74 could by any suitable type of controller, for example a PID (proportional-integral-differential) controller or a pure proportional controller. The output of adder 82 is sent to an adding input of an adding/subtraction unit 84, which receives on its subtracting input a signal from sensor 86 sensing the position of one of the actuator 38 and having its output connected to another proportional controller 88 sending its output signal to actuator 38 (via bus 56, vehicle control unit 52 and valve block 50).

In order to consider the lateral error 68 resulting from the changes in the expected trajectory (path) of the vehicle, a second adding input of adding/subtraction unit 84 is connected to a first electronic calculation unit 90 representing a self-learning model, which receives input on an estimated steering movement from a second electronic calculation unit 92 also representing a model.

The second electronic calculation 92 unit receives, via bus 56, data regarding geometric and drive parameters of the vehicle 12 from the vehicle control unit 52. These data comprise the distance between the front wheels 26 and the rear wheels 28 of vehicle 12 (wheel base), propelling speed of vehicle 12 (sensed for example on the rear wheels 28 or by a radar sensor interacting with the ground) and the distance between the length of the part of the chassis 20 between the center of the rear axle and the three-point hitch 46, and if available, the length of the three-point hitch 46 in the forward direction V. Further on, the second electronic calculation unit 92 receives data regarding the steering movement of the vehicle 12, for example from receiver 48 including its IMU, if provided (via the vehicle control unit 52 and bus 56), or from a separate steering angle sensor 94 interacting with the front wheels 26 in particular if the vehicle 12 is manually steered and has no receiver 48. The second electronic calculation unit 92 can thus receive data regarding at least one of the steering angle of the vehicle 12, a steering angle change rate of the vehicle 12, a propelling direction V of the vehicle 12, and a radius r of a curve driven by the vehicle 12, as indicated in FIG. 2. These data can come from sensor 94 and/or from the control signals sent by vehicle control unit 52 to the steering actuator 64 and/or from receiver 48, which also can contain the inertial measuring unit (IMU) for detecting the yaw angle of vehicle 12 and optionally its change rate.

The second electronic calculation unit 92 works like described above regarding FIG. 2. Thus, the second electronic calculation unit 92 is configured, operable and programmed, to calculate data representing an estimated change of the direction of vehicle 12 and/or an estimated lateral error 68 based on the received data, using a model of the vehicle 12 with the implement 14.

These calculated data are sent to the (optional) first electronic calculation unit 90, which is using a self-learning model to finally provide the second signal to the second adding input of the adding/subtraction unit 84. The self-learning model of the first electronic calculation unit 90 receives the first signal and the signal from the second electronic calculation unit 90 and thus can learn how the system comprising vehicle 12 and implement 14 reacts on certain control signals. It can thus learn during the field operation how the vehicle 10 reacts to steering control signals (this reaction can for example depend on ground conditions like ground moisture and slope) and it can learn geometric parameters (like length of the three-point hitch 46) which are not necessarily known to the implement control unit 54. To learn the mentioned parameters, it would also be possible to have a first learning step after the implement 14 is mounted on the vehicle 12 and, before field operation, the first electronic calculation unit 90 can, when the vehicle 12 moves on a suitable test terrain, provide certain test signals to the adding/subtraction unit 84 and receive the reaction of the system of vehicle 12 and implement 14 to the test signals (by means of the first signal and/or the second signal) to derive kinematical and/or geometrical parameters of the system for later control on the field 10. In this manner, influences that can hardly or only with high efforts be sensed, like ground (traction) properties, topography, ballasting of the vehicle 12, type, size, air pressure, and state of the tires of wheels 26, 28, can thus be considered for controlling the implement 14 and also optionally for controlling the steering of the vehicle 12. The implement control unit 54 thus sends control signals to the actuator 38 which neither under-nor overshoot.

Based on the mentioned data, the first calculation unit 90 can calculate the expected trajectory of the vehicle 12 and/or a resulting path or position of the implement 14, and based thereon provide the first signal to the adding/subtraction unit 84 in order to finally achieve that the implement 14 remains as closely as possible on its desired path over the field 10, despite any steering movement of the vehicle 12 which represents a disturbance to the closed loop control comprising the implement control unit 54, the actuator 38, and the first signal. This disturbance is incorporated in the second signal, which is used for compensating the disturbance.

Figure 4:
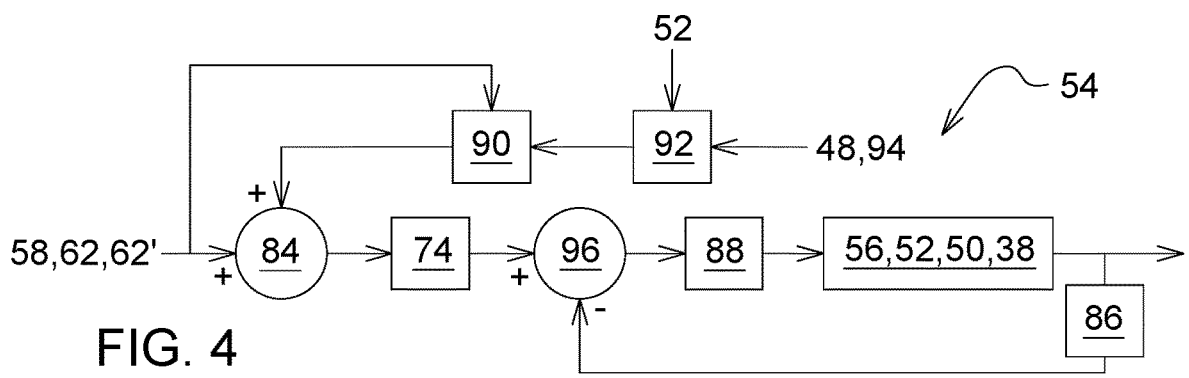
FIG. 4 is a schematic representation of a second embodiment of the system for controlling the lateral position of the implement.
Figure 5:
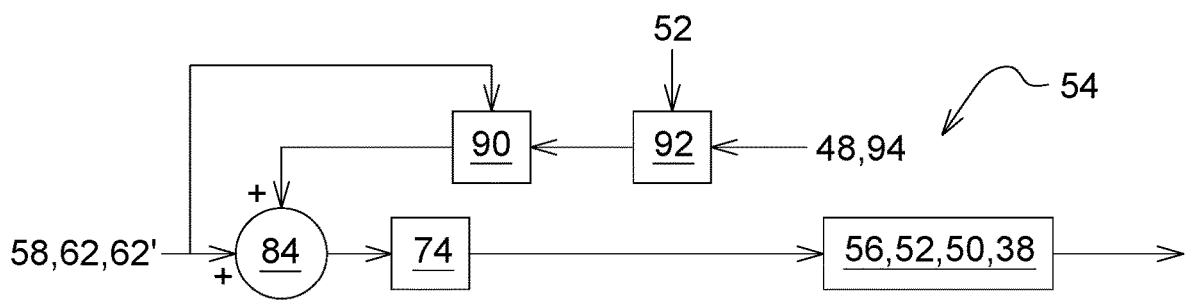
FIG. 5 is a schematic representation of a third embodiment of the system for controlling the lateral position of the implement.

FIGS. 4 and 5 show further possible embodiments of implement control units 54. In both figures, like reference numerals are used for the elements shown in FIG. 3. In FIG. 4, the output of the first calculation unit 90 are sent to the adder 84, which receives with its second input the first signals and the output of the adder 84 is sent to controller 74. The output of controller 74 is sent to a differentiator 96 with the negative input connected to sensor 86. Output of differentiator 96 is sent to the controller 88 controlling actuator 38. In other words, in the embodiment of FIG. 4, the disturbance incorporated in the second signal from the first calculation unit is already summed onto the first control signal at the input of controller 74.

In the embodiment of FIG. 5, the sensor 86 for detecting the position of actuator 38 is omitted. Here, the first signal, which contains information on the position of the implement 14 with respect to the nominal path is used for controlling the actuator 38. The second signal incorporates the disturbance caused by steering motions of the vehicle, like in the other embodiments.

While the present disclosure has been illustrated and described in detail in the drawings and foregoing description, such illustration and description is not restrictive in character, it being understood that illustrative embodiment(s) have been shown and described and that all changes and modifications that come within the spirit of the present disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A system for controlling the position of an implement with respect to a vehicle comprising:
the implement comprising a cross beam supporting a number of row units adapted to perform an agricultural operation on plants standing in rows on a field;
steerable ground engaging front wheels and driven ground engaging rear wheels adapted to propel the vehicle over the field;
an actuator arranged to control at least one of a yaw angle and a lateral position of the implement with respect to the vehicle; and
an implement control unit programmed to control the actuator based upon a first signal regarding a difference between a sensed lateral position of the implement and a nominal lateral position of the implement to minimize the difference between the sensed lateral position and the nominal lateral position in order have the implement and row units of the implement moving along a nominal path defined by the position of the plants on the field based on the first signal;
wherein the first signal is provided by at least one camera with an image processing system, the camera is mounted on the cross beam of the implement and looking onto the field in front of the implement, the image processing system is configured to extract from the images the relative position of the rows of plants with respect to the camera and to compare this position with a pre-stored or programmed nominal position of the plants to provide the first signal;
wherein the implement control unit is configured to control the actuator additionally based on a second signal regarding a steering movement of the vehicle and configured to predictively consider an expected lateral movement of the implement due to a change of the trajectory of the vehicle caused by the steering movement of the vehicle.

2. The system of claim 1, wherein the second signal comprises data regarding at least one of a steering angle of the vehicle and a radius of a curve driven by the vehicle.

3. The system of claim 1, wherein the implement control unit is adapted to learn a relation between the second signal and a control signal to the actuator from the first signal and the second signal.

4. The system of claim 1, wherein the second signal is provided by a sensor interacting with a manually actuated steering system of the vehicle.

5. The system of claim 1, wherein the second signal is provided by at least one of an automatic steering system of the vehicle, a receiver for receiving signals of a satellite-based positioning system associated with the vehicle, and an inertial sensor associated with the vehicle.

6. The system of claim 1, wherein the first signal is provided by a receiver for receiving signals of a satellite-based positioning system, the receiver mounted on the cross beam and augmenting or replacing the signals from the image processing system using a pre-stored map with the location of the plants as reference.

7. The system of claim 6, wherein the signals from image processing systems and receiver are fused based on the relative quality of the signals.

8. The system of claim 1, wherein the row units is configured for weeding, spraying or nursing the plants.

9. A method of controlling an implement connected to a vehicle, the method comprising:
- performing an agricultural operation on plants standing in rows on a field with the implement comprising a cross beam supporting a number of row units;
- propelling the vehicle over the field with steerable ground engaging front wheels and driven ground engaging rear wheels of the vehicle;
- controlling at least one of a yaw angle and a lateral position of the implement with respect to the vehicle with an actuator; and
- controlling the actuator with an implement control unit based upon a first signal regarding the difference between a sensed lateral position of the implement and a nominal lateral position of the implement to minimize the difference between the sensed lateral position and the nominal lateral position in order have the implement and row units of the implement moving along a nominal path defined by the position of the plants on the field based on the first signal;
- wherein the first signal is provided by at least one camera with an image processing system, the camera is mounted on the cross beam of the implement and looking onto the field in front of the implement, the image processing system is configured to extract from the images the relative position of the rows of plants with respect to the camera and to compare this position with a pre-stored or programmed nominal position of the plants to provide the first signal;
- wherein the implement control unit is configured to control the actuator additionally based on a second signal regarding a steering movement of the vehicle and configured to predictively consider an expected lateral movement of the implement due to a change of the trajectory of the vehicle caused by the steering movement of the vehicle.

10. A system for controlling the position of an implement with respect to a vehicle comprising:
- the implement comprising a cross beam supporting a number of row units adapted to perform an agricultural operation on plants standing in rows on a field;
- steerable ground engaging front wheels and driven ground engaging rear wheels adapted to propel the vehicle over the field;
- an actuator arranged to control at least one of a yaw angle and a lateral position of the implement with respect to the vehicle; and
- an implement control unit programmed to control the actuator based upon a first signal regarding a difference between a sensed lateral position of the implement and a nominal lateral position of the implement and to minimize the difference between the sensed lateral position and the nominal lateral position in order have the implement and row units of the implement moving along a nominal path defined by the position of the plants on the field based on the first signal;
- wherein the first signal is provided by a receiver for receiving signals of a satellite-based positioning system, the receiver is mounted on the cross beam using a pre-stored map with the location of the plants as reference;
- wherein the implement control unit is configured to control the actuator additionally based on a second signal regarding a steering movement of the vehicle and configured to predictively consider an expected lateral movement of the implement due to a change of the trajectory of the vehicle caused by the steering movement of the vehicle.

* * * * *